United States Patent [19]

Bissinger

[11] Patent Number: 5,329,091
[45] Date of Patent: Jul. 12, 1994

[54] WELD MONITORING DEVICE

[75] Inventor: Norbert Bissinger, Goeppingen, Fed. Rep. of Germany

[73] Assignee: Deutsche Forschungsanstalt fuer Luft- und Raumfahrt e.V., Bonn, Fed. Rep. of Germany

[21] Appl. No.: 768,625

[22] PCT Filed: Jan. 15, 1991

[86] PCT No.: PCT/EP91/00046
§ 371 Date: Sep. 26, 1991
§ 102(e) Date: Sep. 26, 1991

[87] PCT Pub. No.: WO91/11289
PCT Pub. Date: Aug. 8, 1991

[30] Foreign Application Priority Data

Jan. 30, 1990 [DE] Fed. Rep. of Germany ....... 4002627

[51] Int. Cl.$^5$ .............................................. B23K 26/02
[52] U.S. Cl. ............................. 219/121.83; 219/121.63
[58] Field of Search ...................... 219/121.61, 121.62, 219/121.83, 121.64, 121.63, 121.67, 121.72

[56] References Cited

U.S. PATENT DOCUMENTS

| | | | |
|---|---|---|---|
| 4,446,354 | 5/1984 | Kearney | 219/130.01 |
| 4,766,285 | 8/1988 | Decailloz et al. | 219/121.63 |
| 4,924,063 | 5/1990 | Buchel et al. | 219/121.64 |
| 5,155,329 | 10/1992 | Terada et al. | 219/121.83 |

FOREIGN PATENT DOCUMENTS 3406380 9/1984 Fed. Rep. of Germany.
3507299 4/1985 Fed. Rep. of Germany.

OTHER PUBLICATIONS

Japanese Patent Abstract, Patent No. 62-134191, *Patent Abstracts of Japan*, vol. 11, No. 356, Nov. 20, 1987.
Japanese Patent Abstract, Patent No. 62-124092, *Patent Abstracts of Japan*, vol. 11, No. 344, Nov. 11, 1987.
Baier W. *Elektronik-Lexikon*, Second Edition 1982, pp. 24–26.
Beck, et al., "UV Plasma Sensor for Surveillance of Laser Beam Welding," DVS Report, vol. 113, pp. 58–59, Dusseldorf, 1988.

*Primary Examiner*—C. L. Albritton
*Attorney, Agent, or Firm*—Barry R. Lipsitz

[57] ABSTRACT

In order to improve a weld monitoring device comprising an optical detection device for detecting a light emission of a welding plasma and generating a signal corresponding to the ultraviolet emission portion and also comprising an analyzing device for processing this signal and having at least one analyzing member for ascertaining those interruptions in the ultraviolet emission which exceed a predeterminable length of time, such that, in general, a documentation of a welding process with respect to the interruptions in the ultraviolet emission occurring thereby is possible without preliminary tests and this permits analysis following completion of the welding process, it is suggested that the analyzing device have a plurality of analyzing members, that the predeterminable lengths of time of the individual analyzing members differ from one another, that each analyzing member report each interruption exceeding the respective predeterminable length of time to a storage member and that each storage member retain the reported interruptions for a subsequent read out.

17 Claims, 3 Drawing Sheets

WELD MONITORING DEVICE

The invention relates to a weld monitoring device comprising an optical detection device which detects light emitted by a welding plasma and generates a signal corresponding to the ultraviolet emission portion and also comprising an analyzing device for processing this signal, which has at least one analyzing member for ascertaining those interruptions in the ultraviolet emission which exceed a predeterminable length of time.

Weld monitoring devices of this type are known from the state of the art. These operate with an analyzing member, the predeterminable length of time of which can be adjusted in accordance with the parameters of the welding to be carried out and which then immediately reports an interruption in the ultraviolet emission which exceeds this predeterminable length of time so that the welding process can be interrupted, for example, on the basis of this report.

The disadvantage of this device is to be seen in the fact that for each welding process the interrelations between interruptions in the ultraviolet emission and the welding quality have to be established in individual tests and series of experiments to ascertain what predeterminable length of time must be set, after which the welding is defective and therefore an interruption of the welding process is justified.

The object underlying the invention is therefore to improve a weld monitoring device of the generic type such that, in general, a documentation of a welding process with respect to the interruptions in the ultraviolet emission occurring thereby is possible without preliminary tests and this permits analysis following completion of the welding process.

This object is accomplished in accordance with the invention, for a weld monitoring device of the type described at the outset, in that the read-out means has a plurality of analyzing members, that the predeterminable length of time of the individual analyzing members differs from one another, that each analyzing member reports each interruption exceeding the respective length of time to a storage member and that each storage member retains the reported interruptions for a subsequent read out.

The advantage of the inventive weld monitoring device is therefore to be seen in the fact that any type of welding process can be carried out and that after completion of the welding process there is the possibility of ascertaining what types of interruption in the ultraviolet emission are present in order to evaluate whether or not the welding is faulty under retroactive consideration of the actual result of welding.

Consequently, there is, for example, the possibility of monitoring welding with the inventive weld monitoring device such that first of all a trial weld seam is produced, the number of individual interruptions with the individual predetermined lengths of time is established and by comparison with the actual weld seam produced it is possible to determine a quality standard so that when carrying out future weldings the quality thereof can be assessed immediately afterwards on the basis of the interruptions likewise ascertained.

In this respect, it is particularly advantageous for the analyzing device to digitalize the signal of the detection device by a digitalizing member comprising a threshold member and to transmit to the individual timing circuits a normalized signal 1 when the threshold value is exceeded and a signal 0 when this value is not reached. This facilitates a simple construction of the timing circuits as digital components.

It is even more expedient for the digitalizing member to transmit as normalized signal 1 an equidistant sequence of individual pulses having the same pulse width which can be processed by the timing circuits in a simple manner.

In this respect, it is expedient for the follow-on time of the individual pulses and the pulse width to be shorter than the shortest predeterminable length of time.

In addition, it has proven expedient for the analyzing device to ascertain the length of absence of individual pulses.

In an advantageous embodiment of the inventive weld monitoring device, each timing circuit comprises a triggerable time-limit member which generates a signal once the respective predetermined length of time has elapsed.

A solution which is particularly favourable to carry out is one, in which the triggerable time-limit member comprises a time-based circuit, whereby this is preferably a monostable, subsequently triggerable time-based circuit which, for reasons of simplicity, is, in particular, triggerable at a flank.

Alternatively to the solution with the monostable time-based circuit, a solution is advantageously provided, in which the time-limit member is a counter pre-set to a counting rate determined in accordance with the predetermined length of time, the counter beginning a new count with each trigger pulse.

Expediently, the binary counters of all the time-limit members in this solution are controlled by a common tact generator, in particular an adjustable tact generator. In addition, the limit time of all the time-limit members can be adjusted together within broad limits due to a divider connected to the outlet side of the tact generator.

With respect to the predeterminable time intervals, in an embodiment, which is suitable for an adequate time resolution, the predeterminable lengths of time of the timing circuits differ each time by a predeterminable factor, this factor preferably being a factor two.

With respect to the type of detection of the ultraviolet emission, no details have so far been given. For example, in one embodiment of the inventive detection device, this comprises a light sensor with a filter for passage of ultraviolet light connected to its inlet.

Since ultraviolet filters of this type are very expensive and in some cases do not suppress the long-wave light emission completely, the detection device in a simplified and economical embodiment comprises a first light sensor sensitive to ultraviolet and sensitive in the longer-wave spectral range and a second light sensor of the same type insensitive to ultraviolet but sensitive in the same longer-wave spectral range and that the intensity signal corresponding to the ultraviolet emission results from subtracting the signals of the second from those of the first sensor.

In a further, improved embodiment of the inventive weld monitoring device, this is coupled to a distance measuring system which detects the location, at which the light emission is detected by the detection device.

In this case, there is the possibility of simultaneously taking into the consideration in the weld monitoring device the location, at which the light emission is detected in the detection device.

Preferably, this embodiment is designed such that each storage member stores the report of an interruption together with the location of the detection of the light emission. This means that in addition to the information that an interruption has occurred, the length of time of which exceeds the predeterminable length of time, the respective location can also be simultaneously determined in the storage member with this information. Once the welding process has been carried out, there is the possibility of ascertaining at what location an interruption has resulted with what length of time and, therefore, in retrospect all those locations can be ascertained, at which an irregularity in the welding process was actually present. Through corresponding analysis of the respective locations, a conclusion can then be drawn as to what duration of the interruption results in a lasting negative impairment of the welding process.

This can be realized particularly simply when the weld monitoring device detects an advancing speed, with which the location of the detection of the light emission moves. This can, for example, be done by an incremental measuring process, in which equidistant distance pulses are added together.

In addition, in a further, improved embodiment of the inventive device the predeterminable lengths of time are determinable in accordance with the advancing speed so that, for example, the predeterminable lengths of time, on the basis of which the individual timing circuits operate, are automatically varied with a varying advancing speed.

The inventive weld monitoring device can also be further developed by providing a weld control device, with which welding parameters are controllable in accordance with the number of interruptions ascertained over a specific period of time. Therefore, the number and type of interruptions are preferably ascertained after a specific period of time and as a result the welding parameters, such as, for example, during laser welding the laser intensity and the advancing speed, are determined for the future.

Moreover, the invention relates to a method of monitoring a welding process, in which the interruptions of the ultraviolet emission of a welding plasma are detected and analyzed with respect to them exceeding a plurality of predeterminable lengths of time and the result of this analysis is stored for a subsequent read out.

Additional variations of the inventive method result from the above comments on the embodiments of the inventive weld monitoring device.

Additional advantageous variations of the inventive weld monitoring device and the corresponding method result from the following description as well as the drawings of several embodiments. In the drawings.

Figure 1:
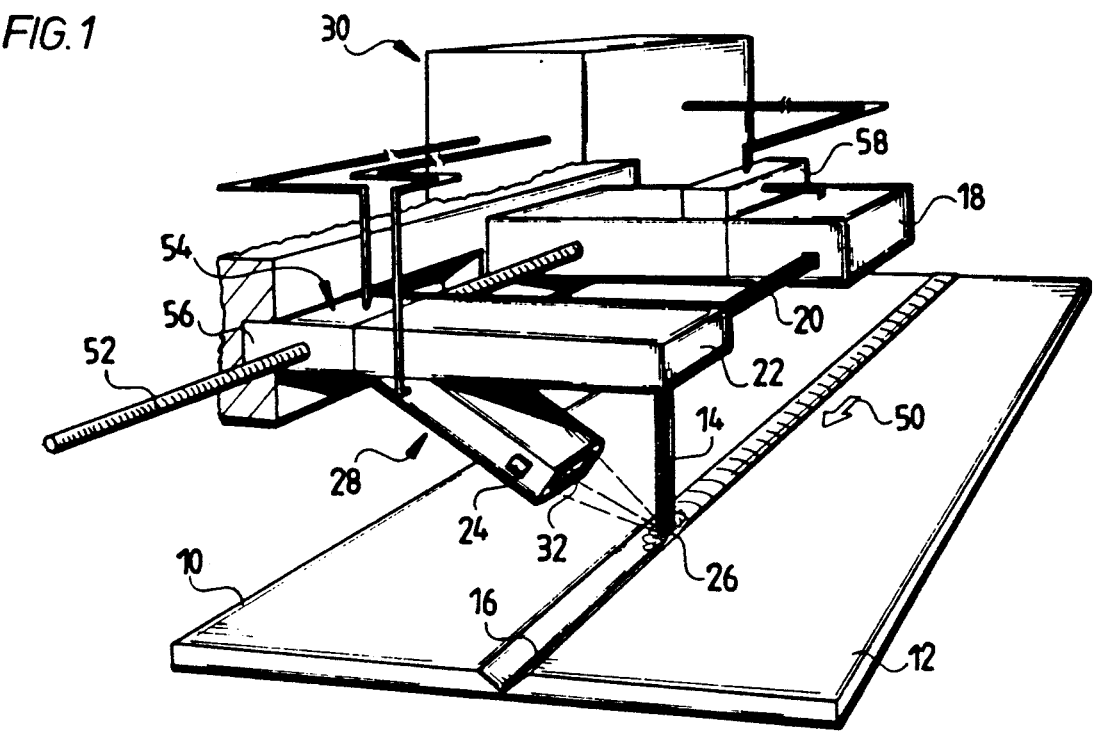
FIG. 1 is a schematic illustration of a welding device.
Figure 2:
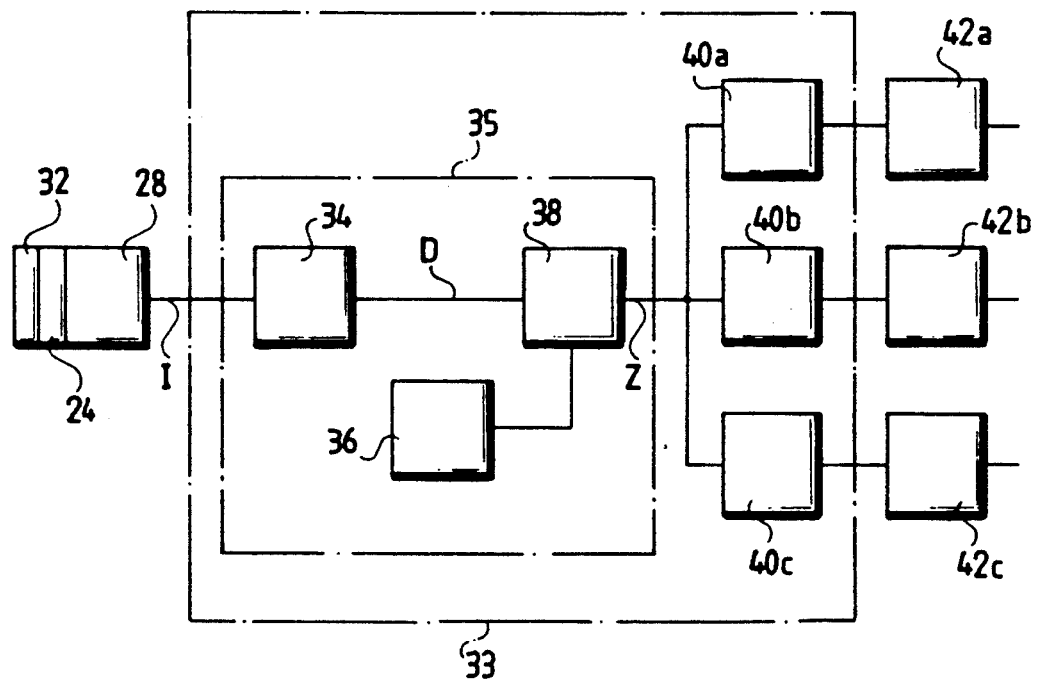
FIG. 2 is a block diagram of an inventive weld monitoring device.

An embodiment of a welding device for welding together two metal plates 10 and 12 by means of a laser beam 14 along a connecting line 16 comprises a stationary laser 18, proceeding from which a laser beam 20 extends to a feed carriage 22 which deflects the laser beam 20 and focusses it as laser beam 14 onto the connecting line 16.

A sensor 24 is also arranged on the feed carriage 22 and this detects the light emission resulting due to formation of a plasma at a welding spot 26 hit by the laser beam 14, in particular the ultraviolet light of the plasma bubbles forming at the welding spot 26.

The sensor 24 is, in addition, part of a detection device designated as a whole as 28 which, for its part, is again part of a weld monitoring device designated as a whole as 30.

For exclusive detection of the ultraviolet light of the plasma bubbles, the sensor 24 is, in the simplest case, provided on its light-sensitive side with an ultraviolet filter which allows only the ultraviolet light to pass through and absorbs or reflects long-wave light.

The detection device 28 generates an electrical signal I which is characteristic for the ultraviolet light intensity detected by the sensor 24.

In the inventive weld monitoring device 30, the signal I is transmitted to an analyzing device 33 comprising a threshold member 34 of a digitalizing means 35 which converts the analog signal I into a digital signal D according to whether the signal I lies above or below a threshold value S which can be set in the threshold member 25.

In addition, the digitalizing means 35 comprises an oscillator 36 which transmits individual pulses, which follow each other in the same time interval and have the same pulse width, to an AND member 38 to which the signal D is also fed.

This AND member 38 allows the sequence of individual pulses from the oscillator 36 to pass when, for example, the signal D is equal to 1.

A signal Z generated by the AND member is transmitted simultaneously and parallel to a series of, for example, three timing circuits 40a to c. Each of these timing circuits 40a to c is constructed such that it then transmits a signal to a storage member 42a or b or c connected to its outlet side when a predetermined length of time Ta, Tb or Tc between two consecutive pulses of the signal Z is exceeded.

The lengths of time Ta, Tb and Tc are preferably selected such that the length of time Tb is twice as long as the length of time Ta and the length of time Tc is twice as long as the length of time Tb.

In the simplest case, the timing circuits 40a to b are subsequently triggerable monostable time-based circuits which are preferably triggerable via a positive flank.

Figure 3:
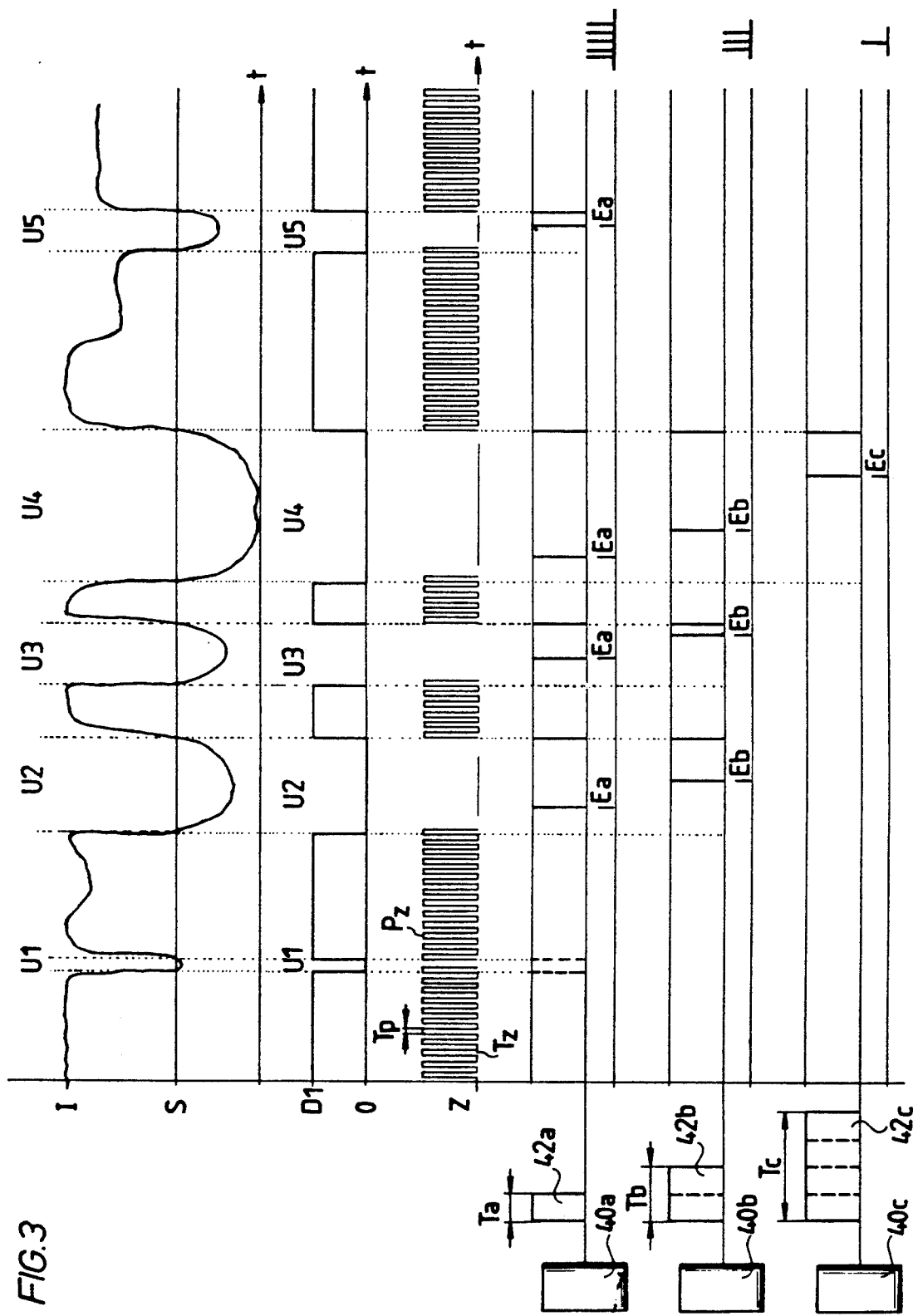
FIG. 3 is a summary illustration of the individual signals occurring in the block diagram according to FIG. 2 and of the stored interruptions.

The function of the inventive weld monitoring device 30 is illustrated in FIG. 3 on the basis of a hypothetical signal I which is transmitted from the detection device 28.

This analog signal I shows a series of interruptions U which represent a plasma bubble formation not occurring at the respective times t and, therefore, the interruption in the plasma formation during the welding process.

These interruptions U1 to U5 occur during the course of movement of the welding spot 26 in welding direction 50.

The threshold member 34 now establishes the threshold S and digitalizes the signal I in such a manner that the output signal D generated by the threshold member 34 is 1 when the signal I is above the threshold value for the intensity whereas the signal is equal to 0 when the signal I is below the threshold value S.

The length of time of the interruptions U1 to U5 is therefore shown in the signal D as a decrease in the signal 1 to the value 0 during the respective lengths of time of the interruptions U1 to U5.

The AND member 38 provides an AND connection between the signal D and individual pulses Pz having a pulse width Tp and following one another at equidistant time intervals Tz. The output signal Z leaving the AND member therefore shows during the time t, during which the signal D was equal to 1, the occurrence of the pulses Pz and during the interruptions U1 to U5 an absence of the pulses Pz.

If such a signal Z is transmitted to the subsequently triggerable monostable time-based circuit 40a, which is triggered at a positive flank, and this time-based circuit maintains the signal at one during a predetermined length of time Ta but then drops insofar as no subsequent triggering takes place, a decrease in the signal will always occur and, with it, the report of an interruption when the lengths of time of the interruptions U1 to U5 are greater than the holding time Ta of the subsequently triggerable monostable time-based circuit. If, on the other hand, a subsequent triggering takes place, i.e. a further positive flank appears during the holding time of the subsequently triggerable monostable time-based circuit 40a, the holding time starts to run again from this further positive flank so that no drop of this timing circuit occurs during all the interruptions which are shorter than the holding time Ta of this timing circuit.

In FIG. 3, the interruption U1 is, for example, selected to be shorter than the holding time Ta of the timing circuit 40a. The length of time of the remaining interruptions U2 to U5 is greater than the holding time Ta so that a decrease in the signal occurs for all the interruptions U2 to U5.

This decrease in the signal is reported to the storage member 42a which stores this decrease in signal as an occurrence E1.

All the additional occurrences Ea are also stored by the storage member 42a.

The timing circuit 40b functions, in principle, in exactly the same manner as the timing circuit 40a with the difference that the holding time Tb of the timing circuit 40b is twice as long as the holding time Ta of the timing circuit 40a.

For this reason, all those interruptions U1 to U5, the length of time of which is shorter than the holding time Tb of the timing circuit 40b, are bridged. In the embodiment selected in FIG. 3 this applies for the interruptions U1 and U5 whereas the lengths of time of the interruptions U2, U3 and U4 are longer than the holding time Tb so that in the case of the interruptions U, U3 and U4 a drop in the signal occurs and, therefore, the occurrences Eb are transmitted to the storage member 42b.

The timing member 40c has a holding time Tc which is twice as long as the holding time Tb. In the embodiment illustrated in FIG. 3, a drop in the timing member 40c therefore occurs only at the interruption U4 and so the signal Ec is transmitted to the storage member 42c.

The storage members 42 for storing and subsequent read out of the individual interruptions E reported by the timing circuits can be designed in the most varied ways.

Figure 4:
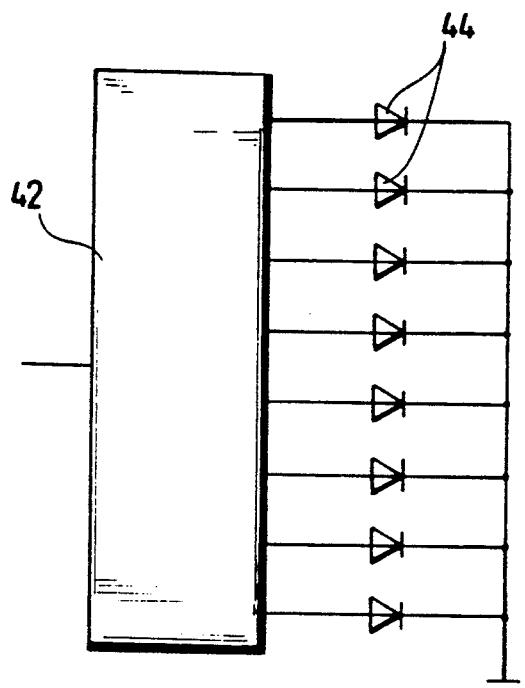
FIG. 4 is a variation of a storage member with read-out capability.

In the simplest case, the storage members 42 are designed as counters which add up the occurrences E and provide a read out at the end of the welding process. For example, as illustrated in FIG. 4 each counter 42 is provided with eight light diodes 44 which indicate the position of the counter 42 in binary code.

In an improved embodiment of the weld monitoring device, the feed path of the welding spot 26 per unit of time is ascertained, in addition, via a distance measuring means 54 which comprises, for example, a measuring rod 52 and a distance measurement sensor 56. The occurrences E are then stored in correlation to the respective time t, at which they occurred, so that at the end of the welding process the number of occurrences E can, on the one hand, be ascertained from the respective storage members 42a to c and, at the same time, the time they occurred. This means that it can be specified via the feed velocity detected by the distance measuring means 52 after what distance of travel of the feed carriage 22 and, therefore, at what position of the welding spot 26 in welding direction 50 the plasma bubble formation stopped for a length of time which was longer than the respective predetermined length of time T and so, for example, a faulty welding can be recognized.

In a further, improved embodiment, as already illustrated in FIG. 3, a welding control device 58 is provided which controls the welding parameters, for example the intensity of the laser 18. This welding control device reads the storage members 42a to c after the welding spot 26 has travelled along a predetermined path and subsequently controls the welding parameters, for example the intensity of the laser 18, in accordance with the occurrence of interruptions with the lengths of time Ta, Tb and Tc.

In the inventive weld monitoring device, the time resolution can be selected to be as good as possible, for which purpose the number of timing circuits is to be increased and, therefore, a larger number of predetermined lengths of time are also available for registering an interruption in the respective storage member 42 when the lengths of time are exceeded.

Figure 5:
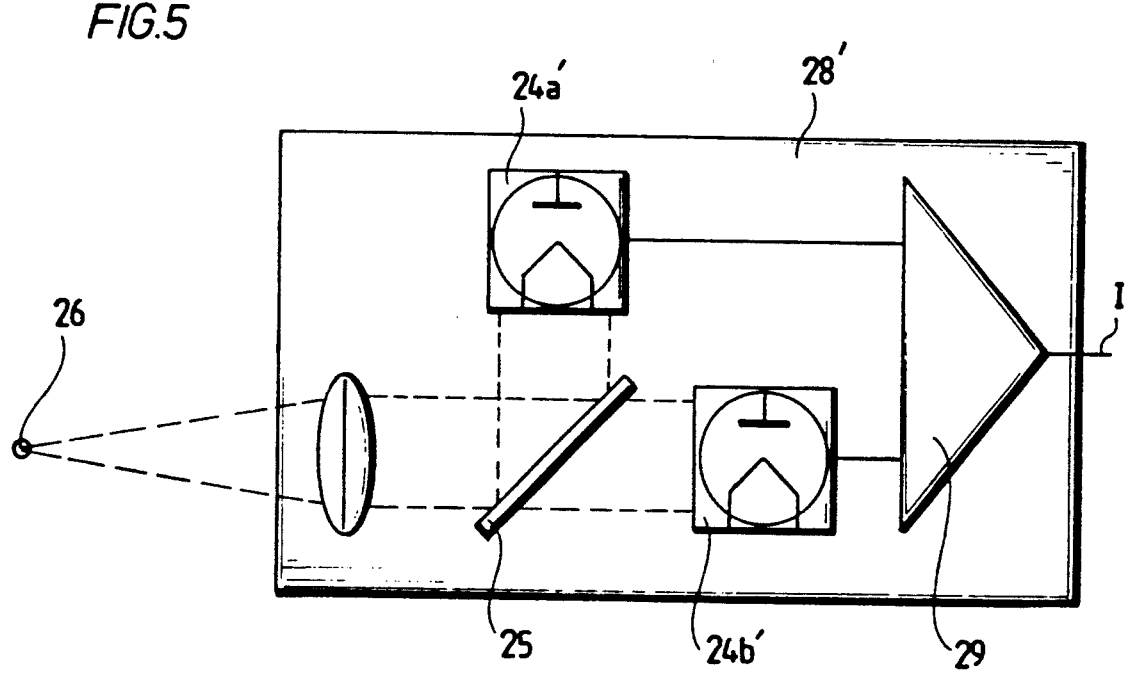
FIG. 5 is a variation of a detection device.

A further embodiment of an inventive detection device 28', illustrated in FIG. 5, comprises in contrast to the first embodiment two sensors 24a' and 24b', to which the light radiating from the welding spot 26 is distributed, for example, with a semipermeable plate 25. In this respect, the sensor 24a' is a sensor sensitive to ultraviolet, for example a semiconductor diode sensitive to ultraviolet, whereas the sensor 24b' is a sensor of the same type insensitive to ultraviolet, for example a semiconductor diode insensitive to ultraviolet. Both sensors 24a' and 24b' have, however, the same spectral sensitivity in the spectral range which has longer waves than the ultraviolet range.

The signal of both sensors 24a' and 24b' is now passed to the two inputs to a differential member 29 which subtracts the intensities measured by the two sensors 24a' and 24b' from one another and, therefore, also transmits as signal I a signal which corresponds in its intensity to the intensity of the ultraviolet emission of the plasma bubbles.

I claim:

1. A weld monitoring device comprising an optical detection device for detecting a light emission of a welding plasma and generating a signal corresponding to an ultraviolet emission portion thereof and also comprising an analyzing device for processing this signal, said device having a plurality of analyzing members for ascertaining those interruptions in the ultraviolet emission exceeding a different predeterminable length of time for each individual analyzing member, each analyzing member including means for reporting each interruption exceeding its respective predeterminable length of time to a storage member, each storage member retaining the reported interruptions for a subsequent read out.

2. A weld monitoring device as defined in claim 1, characterized in that the analyzing device digitizes a signal of the optical detection device with a digitizing member comprising a threshold member and transmits to individual timing circuits of the analyzing members of first digital signal when a threshold value is exceeded and a second digital signal when this value is not reached.

3. A weld monitoring device as defined in claim 2, characterized in that the digitizing member transmits as said first digital signal an equidistant sequence of individual pulses having the same pulse width.

4. A weld monitoring device as defined in claim 3, characterized in that a follow-on time and the pulse width are together shorter than the shortest predeterminable length of time.

5. A weld monitoring device as defined in claim 3, characterized in that the analyzing device ascertains the length of absence of individual pulses.

6. A weld monitoring device as defined in claim 1, characterized in that each of said analyzing members comprises a triggerable time-limit member for generating a signal once the respective predeterminable length of time has elapsed.

7. A weld monitoring device as defined in claim 6, characterized in that the triggerable time-limit member comprises a monostable, subsequently triggerable time-based circuit.

8. A weld monitoring device as defined in claim 6, characterized in that the triggerable time-limit member is a counter set to a counting rate determined in accordance with the predetermined length of time, said counter beginning a new count with each trigger pulse.

9. A weld monitoring device as defined in claim 8, characterized in that the counters of all the time-limit members are controlled by a common tact generator.

10. A weld monitoring device as defined in claim 1, characterized in that the predeterminable lengths of time of the analyzing members differ each time by a predeterminable factor.

11. A weld monitoring device as defined in claim 11, characterized in that the optical detection device comprises a light sensor with a filter for passage of ultraviolet light connected to its inlet.

12. A weld monitoring device as defined in claim 1, characterized in that the optical detection device comprises a first light sensor sensitive to ultraviolet light and a second light sensor of the same type insensitive to ultraviolet light and that an intensity signal corresponding to the ultraviolet emission results from subtracting the signals of the second sensor from those of the first sensor.

13. A weld monitoring device as defined in claim 1, characterized in that the weld monitoring device is coupled to a distance measuring system for determining the movement of a welding location, a light emission of which is detected by the optical detection device.

14. A weld monitoring device as defined in claim 13, characterized in that each storage member stores a report of an interruption together with the welding location at which the light emission is detected.

15. A weld monitoring device as defined in claim 13, characterized in that the weld monitoring device detects an advancing speed, at which the detection of the light emission at the welding location moves.

16. A weld monitoring device as defined in claim 15, characterized in that the predetermined lengths of time are determinable in accordance with the advancing speed.

17. A weld monitoring device as defined in claim 1, characterized in that a welding control device is provided for controlling welding parameters in accordance with the interruptions ascertained over a specific period of time.

* * * * *